(12) United States Patent
Perrin et al.

(10) Patent No.: US 12,304,249 B2
(45) Date of Patent: May 20, 2025

(54) TREAD FOR AN AGRICULTURAL VEHICLE

(71) Applicant: COMPAGNIE GENERALE DES ETABLISSEMENTS MICHELIN, Clermont-Ferrand (FR)

(72) Inventors: Frédéric Perrin, Clermont-Ferrand (FR); David Dean, Clermont-Ferrand (FR); Maxime Pras, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 544 days.

(21) Appl. No.: 17/293,870

(22) PCT Filed: Nov. 13, 2019

(86) PCT No.: PCT/FR2019/052692
§ 371 (c)(1),
(2) Date: May 13, 2021

(87) PCT Pub. No.: WO2020/099780
PCT Pub. Date: May 22, 2020

(65) Prior Publication Data
US 2022/0118797 A1    Apr. 21, 2022

(30) Foreign Application Priority Data
Nov. 14, 2018 (FR) ........................... 1860469

(51) Int. Cl.
*B60C 11/03* (2006.01)
*B60C 11/12* (2006.01)
(Continued)

(52) U.S. Cl.
CPC ...... *B60C 11/0302* (2013.01); *B60C 11/0306* (2013.01); *B60C 11/124* (2013.01);
(Continued)

(58) Field of Classification Search
CPC .............. B60C 11/1376; B60C 11/124; B60C 11/0302; B60C 2200/08; B60C 11/0306; B60C 11/1281; B60C 11/0311
See application file for complete search history.

(56) References Cited

U.S. PATENT DOCUMENTS 5,795,415 A * 8/1998 Campana ............ B60C 11/0306
152/DIG. 3
5,896,905 A * 4/1999 Lurois ................. B60C 11/1392
152/DIG. 3
(Continued)

FOREIGN PATENT DOCUMENTS

CN    107584974    1/2018
EP    0 384 182    8/1990
(Continued)

OTHER PUBLICATIONS

JP S61-143206 Machine Translation; Wada, Makoto (Year: 1986).*
JP 2003-154527 Machine Translation; Hoya, Akira (Year: 2003).*

*Primary Examiner* — Katelyn W Smith
*Assistant Examiner* — Nicholas J Weiler
(74) *Attorney, Agent, or Firm* — COZEN O'CONNOR

(57) ABSTRACT

A tread (2) for the driven axle of an agricultural vehicle having tread pattern elements (21, 41) extending radially towards the outside from a bearing surface (22). The tread pattern elements have, in the central part of the tread, a series of blocks (41) juxtaposed with one another in the longitudinal direction and separated by transverse cuts (42), and having, in the rolling direction (15), a leading face, a contact face and a trailing face. The leading face having a radial height greater than the radial height of the trailing face. The contact face being oriented at an angle α with respect to radial direction Z, α being between 93 and 105° and radial depth PR of the transverse cuts (42) being at least 50% of the (Continued)

radial height of the leading face, the width of the blocks representing at least 15% of the width of the tread.

17 Claims, 5 Drawing Sheets

(51) Int. Cl.
    *B60C 11/13*          (2006.01)
    *B62D 55/24*          (2006.01)
(52) U.S. Cl.
    CPC ........ *B60C 11/1376* (2013.01); *B62D 55/244* (2013.01); *B60C 2200/08* (2013.01)

(56) References Cited

U.S. PATENT DOCUMENTS

| | | | |
|---|---|---|---|
| 6,382,283 B1 * | 5/2002 | Caretta | B60C 11/12 |
| | | | 152/902 |
| D621,778 S * | 8/2010 | Pringiers | D12/544 |
| 2018/0009267 A1 | 1/2018 | Takahashi | |
| 2020/0001656 A1 * | 1/2020 | Limroth | B60C 11/04 |

FOREIGN PATENT DOCUMENTS

| | | | |
|---|---|---|---|
| JP | S61-143206 | * | 6/1986 |
| JP | H 11-342707 | | 12/1999 |
| JP | 2003154527 A | * | 5/2003 |

* cited by examiner

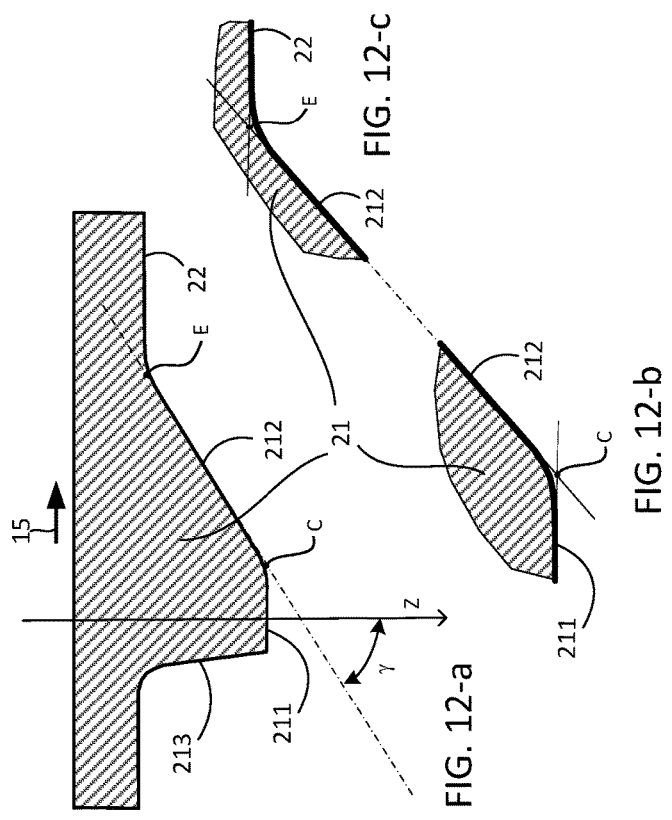
FIG. 11
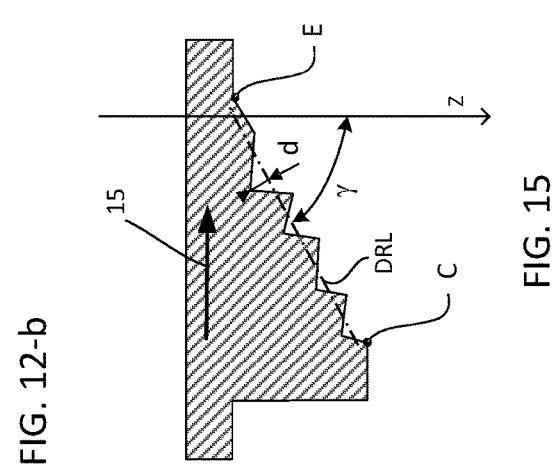
FIG. 12-a    FIG. 12-b    FIG. 12-c
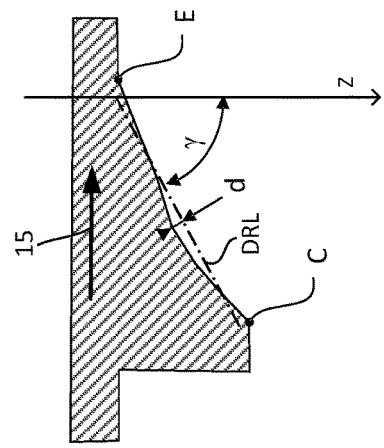
FIG. 13
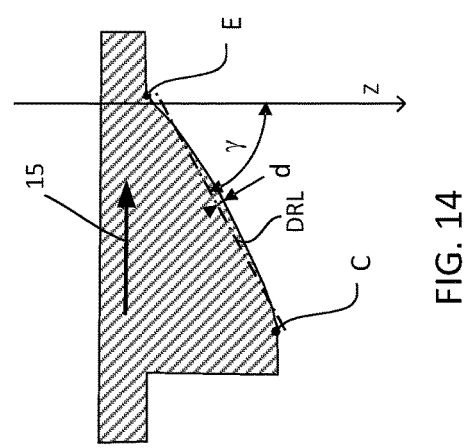
FIG. 14
FIG. 15

TREAD FOR AN AGRICULTURAL VEHICLE

RELATED APPLICATIONS

This is a U.S. National Phase Application under 35 USC 371 of International Application PCT/FR2019/052692 filed on Nov. 13, 2019.

This application claims the priority of French application no. 18/60469 filed Nov. 14, 2018, the entire content of which is hereby incorporated by reference.

FIELD OF THE INVENTION

The present invention relates to a tread intended to equip an agricultural vehicle, and more particularly to a tread having improved traction performance on loose ground.

Although not limited to this type of application, the invention will be more particularly described with reference to a multipurpose agricultural vehicle, that is to say a vehicle that can be driven both in the fields on loose ground and on roads, such as an agricultural tractor.

BACKGROUND OF THE INVENTION

A tread for an agricultural vehicle may be for example attached to the periphery of a tire. A tread may also not be associated with a tire intended to be mounted on a rigid rim but be associated with a non-pneumatic resilient wheel, that is to say one that is structurally deformable and does not have an enclosed space containing pressurized air. A tread can also be associated with a caterpillar track for an agricultural vehicle.

Such a tread is intended to run over various types of ground such as the more or less compact soil of the fields, unmade tracks providing access to the fields, and the tarmacked surfaces of roads. Bearing in mind the diversity of use, in the fields and on the road, the tread of an agricultural tractor needs to offer a performance compromise between traction in the field, resistance to chunking, resistance to wear on the road, rolling resistance, and vibrational comfort on the road.

In the present document, a radial direction means any direction that is perpendicular to the axis of rotation of the wheel. This direction corresponds to the direction of the thickness of the tread and is generally referenced "Z".

A transverse or axial direction means a direction parallel to the axis of rotation of the wheel. This direction is generally referenced "Y".

A circumferential direction means a direction tangential to any circle centred on the axis of rotation of the wheel. This direction is perpendicular both to the axial direction and to any radial direction and corresponds to the direction of travel of the tread while it is being used. This direction is generally referenced "X".

Generally, a tire comprises a crown comprising, radially on the outside, a tread that is intended to come into contact with the ground via a tread surface, two beads that are intended to come into contact with a rim on which the tire is mounted, and two sidewalls that join the crown to the beads. A tire for an agricultural tractor comprises a carcass reinforcement, anchored in each bead, usually made up of at least one layer of textile reinforcing elements.

The carcass reinforcement is usually surmounted radially on the outside by a crown reinforcement made up of a plurality of working layers, each working layer being made up of textile or metal reinforcing elements coated in an elastomeric material. The reinforcing elements are generally crossed from one layer to the next.

The tread, which is the part of the tire that is intended to come into contact with the ground when running, comprises a bearing surface parallel or substantially parallel to the crown reinforcement of the tire. Tread pattern elements are moulded integrally on the bearing surface of the tread.

Cuts separate the tread pattern elements from one another. Among the cuts that can be moulded into a tread, a distinction is made between grooves and sipes. Unlike grooves, sipes have a width appropriate for the opposing walls that delimit them to come at least partially into contact with one another when entering the contact patch. The grooves bring about a substantial lowering of the compression and shear stiffnesses of the tread because these grooves delimit portions of material that are able to deform much more than the portions delimited by sipes, the walls of which come to bear against one another when entering the contact patch.

Treads for agricultural vehicles conventionally have lugs extending from the centre of the tread towards the shoulders. These lugs are disposed on each side of the equatorial mid-plane of the tire so as to form a V-shaped pattern, the tip of the V-shaped pattern (or chevron pattern) being intended to be the first part to enter the contact patch in which contact is made with the ground. The lugs are spaced apart from one another so as to form furrows or grooves; the width of these furrows is determined so as to allow good operation both on the road and on loose ground. The lugs exhibit symmetry with respect to the equatorial mid-plane of the tire, usually with a circumferential offset between the two rows of lugs, similar to that obtained by one half of the tread being rotated about the axis of the tire with respect to the other half of the tread. Moreover, the lugs may be continuous or discontinuous, and may be distributed circumferentially with a spacing that is constant or variable. The lugs have a contact face intended to roll over firm ground, for example the roads taken to reach the vicinity of the fields, and a leading face intended to transmit the driving force when the agricultural vehicle is travelling over loose ground, typically the soil in the fields. For this purpose, the leading face of the lugs is generally parallel to a radial direction.

A recurring dissatisfaction relates to the traction performance of the known treads on loose ground. The productivity of agricultural vehicles is directly linked to the traction capability thereof on loose ground. Improving this performance would allow the user to improve not only the efficiency of their equipment but also to reduce their operating costs, for example by reducing the fuel consumption per unit of area covered. Of course, the improvement in traction should not be at the expense of other performance aspects, for example wear resistance, comfort and the possibility of running at a sufficiently high speed on the road.

BRIEF SUMMARY OF THE INVENTION

This objective has been achieved according to an embodiment of the invention by a tread for the driven axle of an agricultural vehicle, said tread comprising tread pattern elements extending radially towards the outside from a bearing surface, said tread pattern elements comprising, in the central part of the tread, a series of blocks that are juxtaposed with one another in the longitudinal direction, said tread pattern blocks being separated from one another by transverse cuts, said blocks having, in the rolling direction, a leading face, a contact face and a trailing face, said leading face having a radial height HRA greater than the radial height HRF of the trailing face, the contact face being oriented at an angle α with respect to the radial direction Z, α being between 93 and 105 degrees and the radial depth PR of the transverse cuts being at least equal to 50% of the radial height HRA of the leading face, the width of said blocks representing at least 15% of the width of the tread.

Preferably, the transverse cuts are transverse sipes.

Preferably, the angle α is between 97 and 100 degrees.

Preferably, the radial depth of the transverse sipes is at least equal to 70% of the radial height of the leading face.

Preferably, the transverse sipes are inclined towards the front in the rolling direction of the tread, the transverse sipes being oriented at an angle β with respect to the radial direction Z, β being between 5 and 35 degrees.

Preferably, the angle β is at least equal to 20 degrees.

Preferably, such a tread also comprises lateral tread pattern elements, said lateral tread pattern elements comprising a contact face, a leading face and a trailing face, said leading face being inclined at an angle γ towards the rear with respect to the radial direction Z in the rolling direction of the tread, the angle γ being between 50 degrees and 75 degrees.

Preferably, the angle γ is between 60 degrees and 70 degrees.

Preferably, the lateral tread pattern elements are blocks that have a quadrilateral base and form rows in a substantially transverse direction between one another.

Preferably, said tread pattern blocks within each row are disposed such that their leading faces are aligned with one another.

The invention also relates to a tire, a non-pneumatic wheel and a caterpillar track comprising such a tread.

Further features and advantages of the invention will become apparent from the following description given with reference to the appended drawing, which shows, by way of non-limiting example, embodiments of the subject matter of the invention.

BRIEF DESCRIPTION OF THE FIGURES

FIG. 11 is a perspective view showing a tire comprising a tread according to a fifth embodiment of the invention.

FIGS. 12-a to 12-c are schematic detail views of the profile of a lateral tread pattern element of a tread of the invention.

FIGS. 13 to 15 are schematic views of further examples of profiles of a lateral tread pattern element of a tread of the invention.

DETAILED DESCRIPTION OF THE FIGURES

Figure 2:
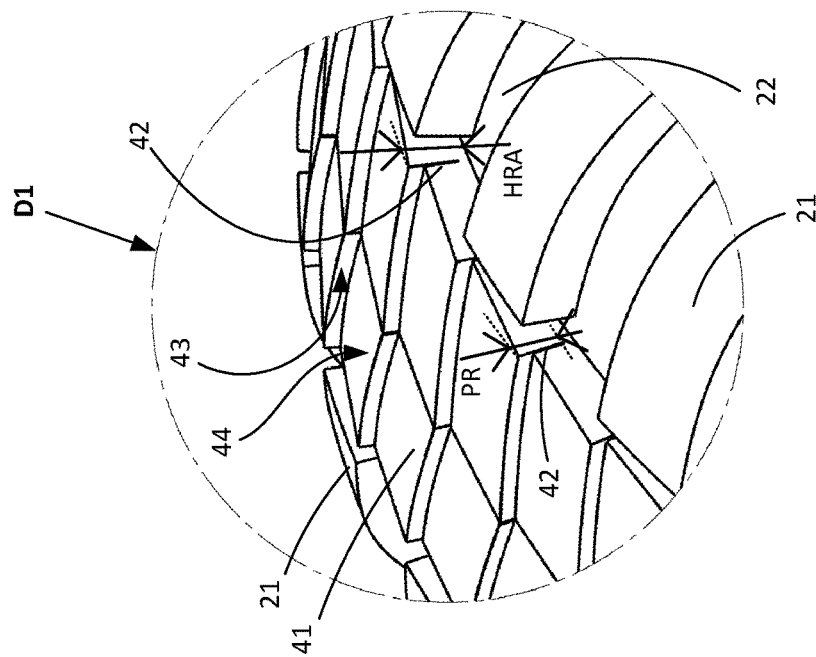
FIG. 2 is a view of the detail D1 in FIG. 1.
Figure 1:
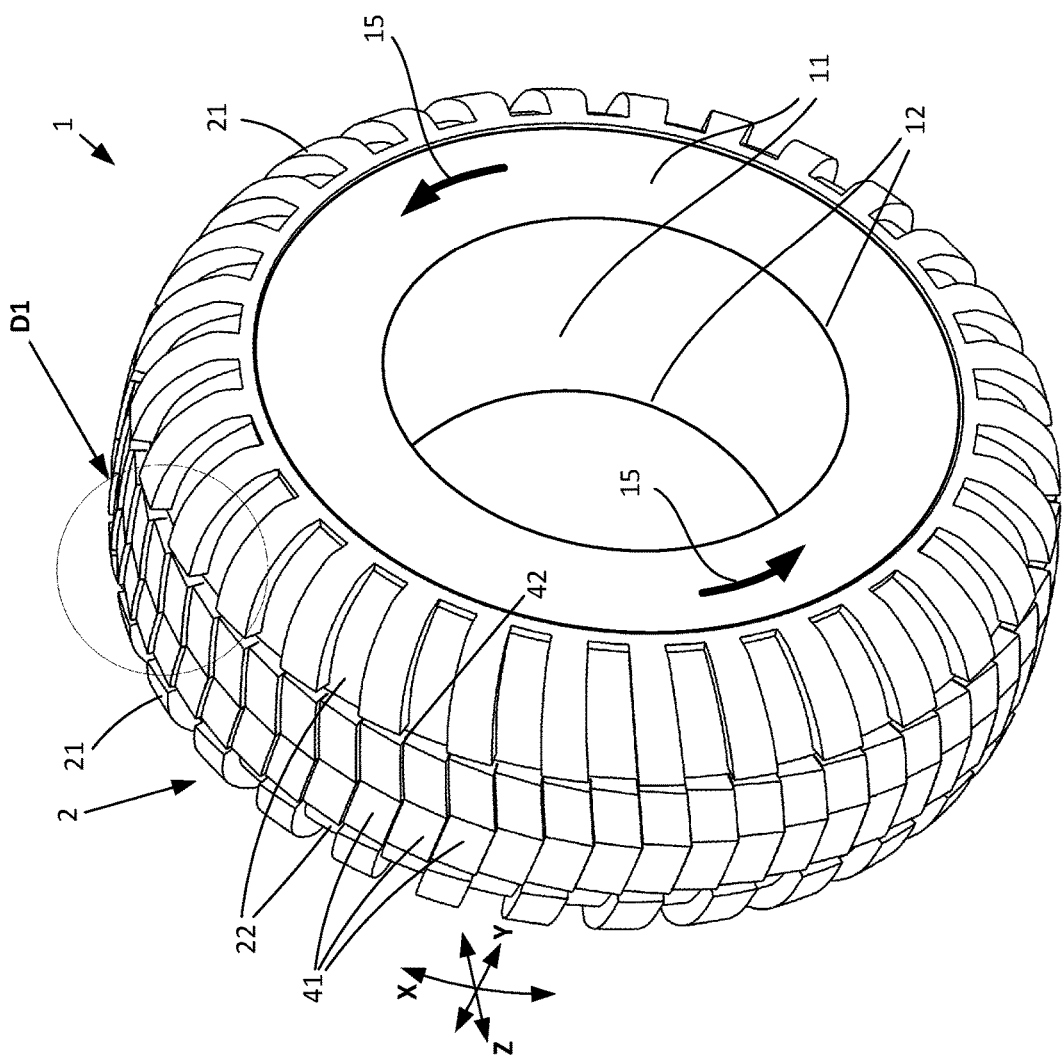
FIG. 1 is a perspective view showing a tire comprising a tread according to a first embodiment of the invention.

FIG. 1 shows a tire 1 comprising a tread 2 according to the invention. This tire is intended to equip a driven axle of an agricultural vehicle. This tire also comprises sidewalls 11 and beads 12 in a manner known per se. The preferred rolling direction of the tire is indicated for example by arrows 15 moulded on the sidewalls of the tire and/or on the shoulder of the tread. The tread pattern of the tread has various tread pattern elements such as blocks or lugs that extend radially towards the outside from a bearing surface 22. The tread 2 comprises in particular, in its central part, a series of tread pattern blocks 41 that are juxtaposed with each other in the longitudinal direction X. These tread pattern blocks are separated from one another by transverse cuts preferably in the form of transverse sipes 42, which can be seen better in the detail view in FIG. 2. The tread shown here has a width of about 600 mm and the series of blocks in the central part has a width of 240 mm, that is to say representing 40% of the width of the tread.

Figure 5:
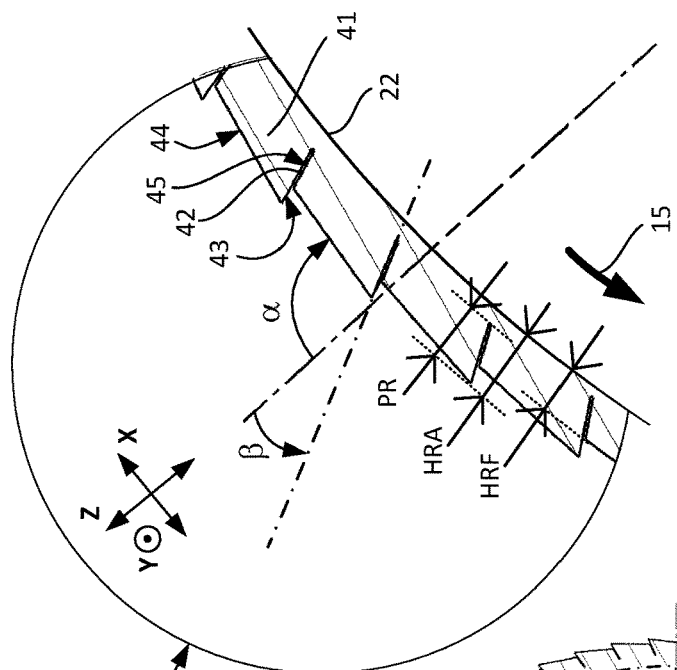
FIG. 5 is a view on a larger scale showing a detail D2 of the section in FIG. 4.
Figure 4:
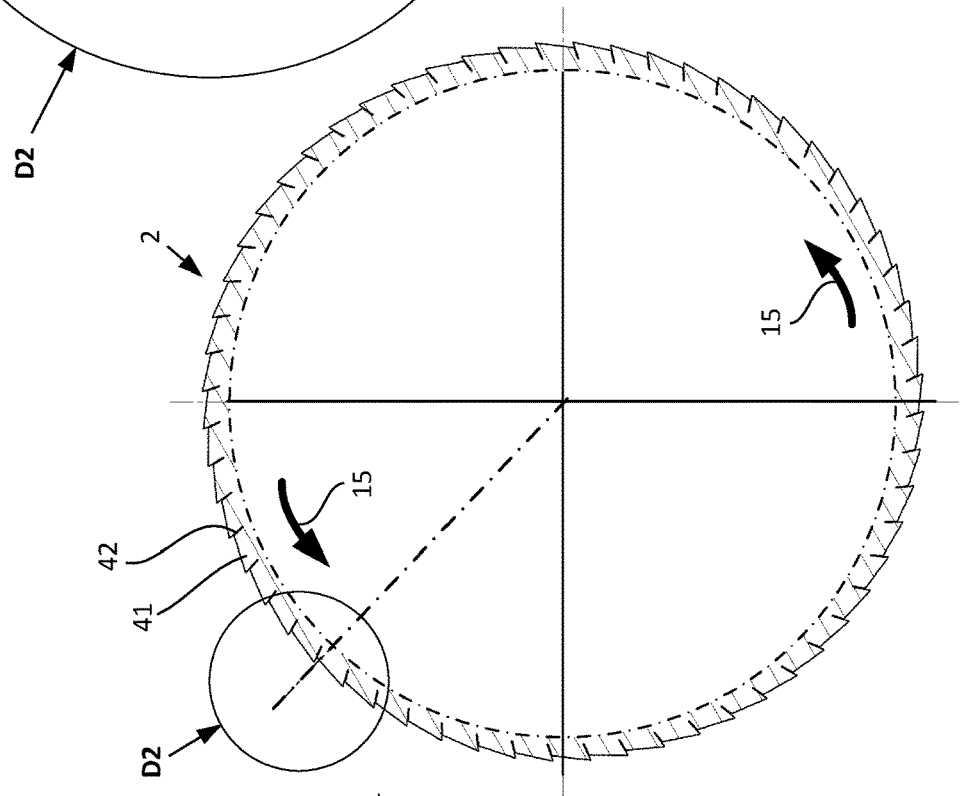
FIG. 4 is a view in section on A-A of the tread in FIGS. 1 to 3.
Figure 3:
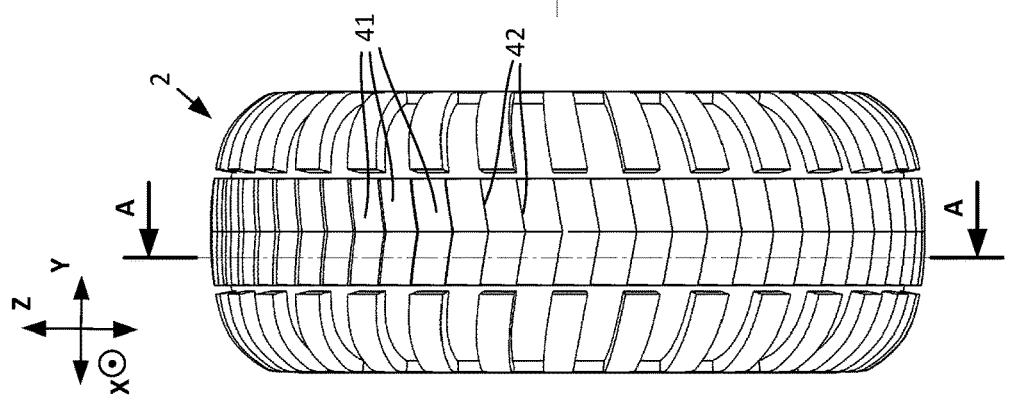
FIG. 3 is a face-on view of the tread of the tire in FIG. 1.

The detail D2 in FIG. 5 shows the series of blocks 41 in section on a plane parallel to the directions X and Z, that is to say perpendicular to the axial direction Y (see A-A in FIG. 3). This figure clearly reveals that each of said blocks 41 of the series has, in the rolling direction 15, a leading face 43, a contact face 44 and a trailing face 45. The contact face is the face at the crown of the block that is intended to roll and bear the load on firm ground. In the preferred rolling direction of the tire, the leading face 43 is thus the face that is the first to enter the contact patch, while the trailing face is the face that is the last to leave the contact patch. On loose ground, the blocks can sink into the ground. According to the invention, the leading face has, from the bearing surface 22, a radial height HRA greater than the radial height HRF of the trailing face. As shown in detail in the FIG. 5, the contact face 44 is thus oriented at an angle α with respect to the radial direction Z, α being between 93 and 105 degrees according to the invention. In this example, the angle α is 97 degrees. The sipe 42 is in the continuation of the leading face and forms an angle β with the radial direction Z. In this example, the angle β is 25 degrees. The radial depth PR of the sipes is at least equal to 50% of the radial height HRA of the leading faces; in this example, PR is about 70% of HRA. The bottom of the sipes 42 may also have a locally enlarged shape in a manner known per se.

Figure 6:
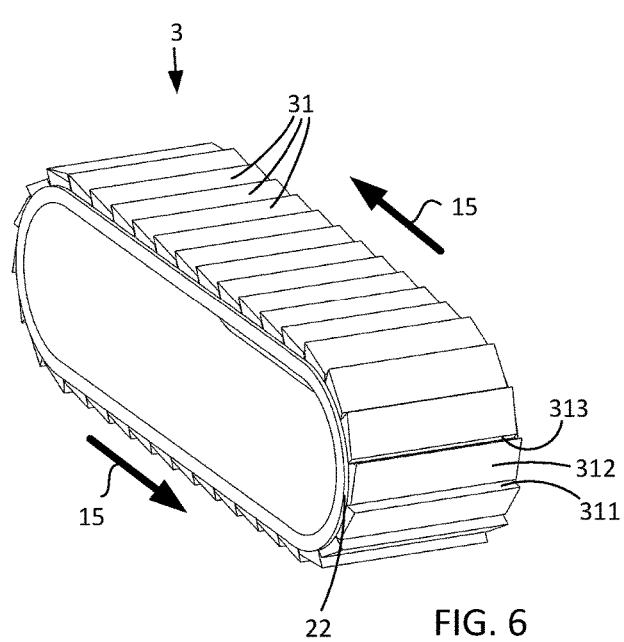
FIG. 6 is a perspective view showing a caterpillar track comprising a tread according to a second embodiment of the invention.
Figure 7:
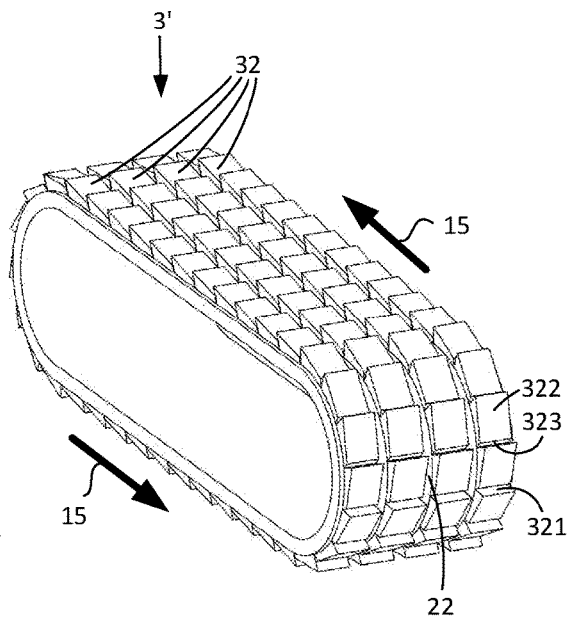
FIG. 7 is a perspective view showing a caterpillar track comprising a tread according to a third embodiment of the invention.
Figure 8:
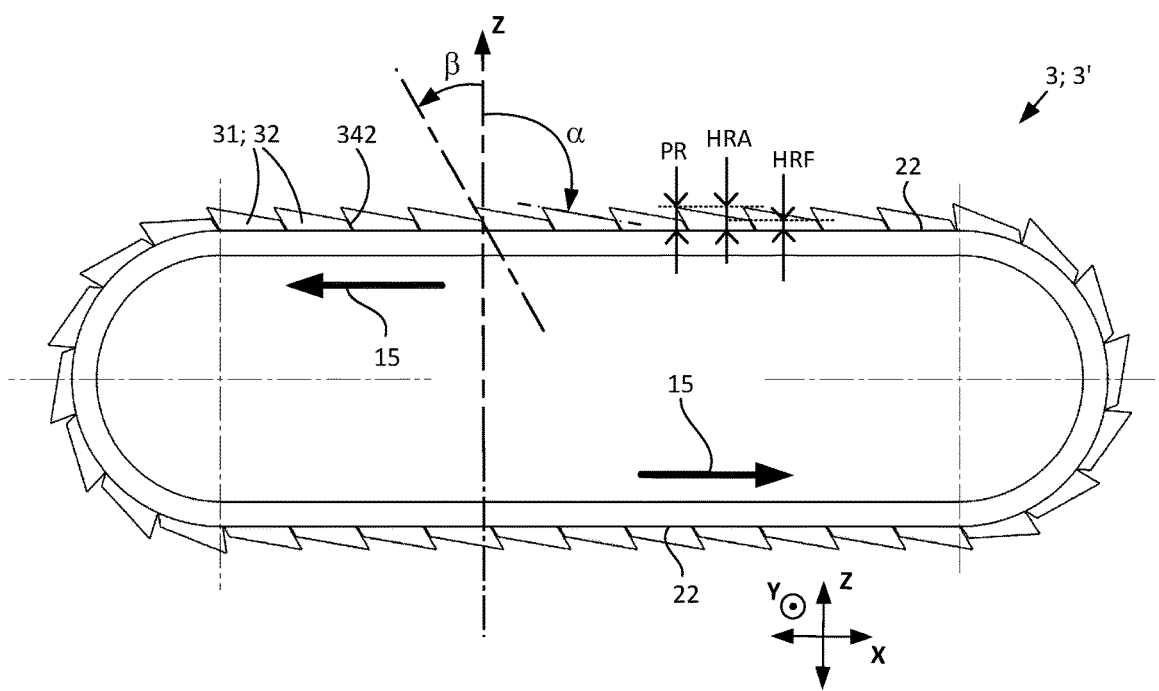
FIG. 8 is a side view illustrating a caterpillar track according to FIG. 6 or 7.

FIGS. 6 to 8 show embodiments of the invention applied to caterpillar tracks.

In FIG. 6, the caterpillar track 3 has transverse lugs 31 that are longitudinally juxtaposed and separated by transverse sipes 342. With reference to the preferred rolling direction (arrows 15), each lug has a leading face 311, a contact face 312 and a trailing face 313.

In FIG. 7, the caterpillar track 3' has blocks 32 that are juxtaposed both longitudinally and transversely. With reference to the preferred rolling direction (arrows 15), each block has a leading face 321, a contact face 322 and a trailing face 323.

In these two examples, the width of the lugs or rows of blocks represents 100% of the width of the tread.

The side view in FIG. 8 can show each of these two embodiments and makes it possible to better understand the angles and dimensions already described above with reference to FIG. 5. The leading faces have a height HRA greater than the height HRF of the trailing faces such that bearing faces form an angle α with the radial direction Z. In this example, the angle α is 100 degrees. The sipes 342 are in the continuation of the leading faces and form an angle β with the radial direction Z. In this example, the angle β is 30 degrees. The radial depth PR of the sipes is equal to 100% of the height HRA of the leading faces in this example.

Figure 10:
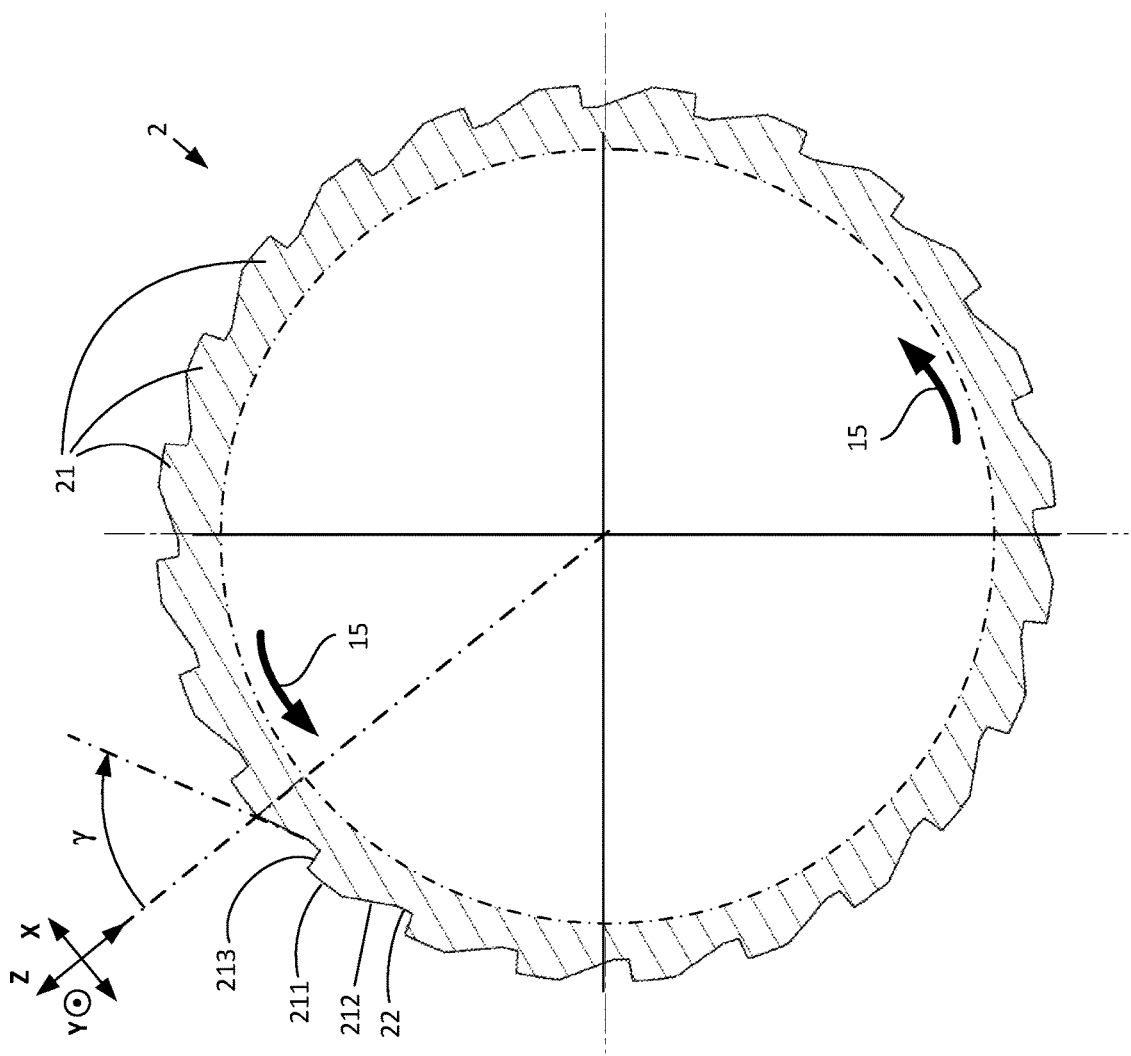
FIG. 10 is a view in section on B-B of the tread in FIG. 9.
Figure 9:
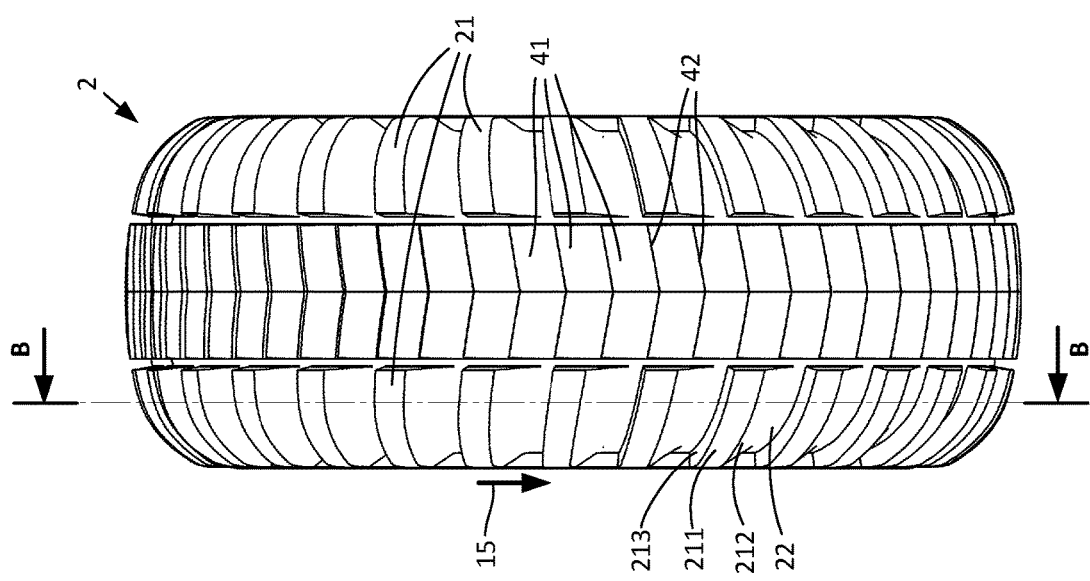
FIG. 9 is a face-on view showing a tire comprising a tread according to a fourth embodiment of the invention.

FIGS. 9 to 11 illustrate embodiments of the invention in which the tread has, outside its central part, lateral tread pattern elements in the form of blocks or portions of lugs 21.

Each lateral block 21 has in particular a contact face 211, a leading face 212 and a trailing face 213. The contact face is the face at the crown of the block that is intended to roll and bear the load on firm ground. On loose ground, the blocks can sink into the ground. In the preferred rolling direction of the tire, the leading face 212 is thus the face that is the first to enter the contact patch and can transmit a driving force, while the trailing face is the face that is the last to leave the contact patch. The trailing face 213 can only transmit force to the ground during a braking or reversing phase.

FIG. 10 depicts the section B-B from the face-on view of the tire shown in FIG. 9. This section makes it possible to clearly see the orientation of the leading faces of the blocks or portions of lugs 21. The leading faces are inclined towards the rear with respect to the radial direction in the preferred rolling direction indicated by the arrows 15 and form an angle γ with this radial direction Z. The angle γ is between 50° and 75°. In this example, the angle γ is 60°.

The tread according to this embodiment is perfectly symmetric with respect to the equatorial mid-plane of the tire. In a variant that is not shown, the lateral patterns of the two halves of the tread that are situated on either side of the equatorial mid-plane can, by contrast, be offset with respect to one another in the circumferential direction, as is often the case for lug tread patterns of prior art agricultural tires.

FIG. 11 illustrates a tire according to another embodiment of the invention in which the lateral tread pattern elements are tread pattern blocks substantially having a quadrilateral base. Within each row, the blocks are disposed such that their leading faces are aligned with one another, meaning that together they are almost continuous, only being interrupted by longitudinal cuts 23. Moreover, the lateral blocks adjoining the central part of the tread are integral with the adjacent blocks of the central part. This connection alternates between the series of lateral blocks on one side of the tread and the series of lateral blocks on the other side of the tread. Transverse sipes in the leading faces of the lateral blocks are aligned with the transverse sipes 42 that separate the blocks of the central part from one another. The tread shown here has a width of about 600 mm and the series of blocks in the central part has a width of about 140 mm, that is to say representing 23% of the width of the tread.

FIGS. 12-a to 12-c show, on a larger scale, an example of a lateral-block profile in which the leading face 212 is connected to the contact face 211 and the bearing surface SP by fillets. A point C is defined at the intersection of the continuations of the leading face and of the contact face and a point E is defined at the intersection of the continuations of the leading face 212 and of the bearing surface 22. The inclination angle γ of the leading face is thus the angle that the straight line passing through C and E makes with the radial direction Z.

FIGS. 13, 14 and 15 show examples of cases in which the leading face 212 is not flat. In this case, the inclination angle γ of the linear regression line DRL of the profile of the leading face between the points C and E at which the leading face meets the contact face 211 and the bearing surface 22, respectively, will be considered. Preferably, the distance d between the profile and the linear regression line DRL thereof remains less than 15 mm.

Comparative tests have shown that the treads in FIGS. 1, 9 and 11 very substantially enhance the traction performance on loose ground compared with a conventional tread. Improvements of between 10% and 55% were measured depending on the test conditions and in particular depending on the typology of the ground and the rate of slip considered.

The invention is not intended to be limited to just these described exemplary embodiments and various modifications can be made thereto while remaining within the scope as defined by the claims.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tread for a driven axle of an agricultural vehicle, said tread comprising:
    tread pattern elements extending radially towards the outside from a bearing surface, said tread pattern elements comprising:
        in a central part of the tread, a series of tread pattern blocks that are juxtaposed with one another in a longitudinal direction,
        said tread pattern blocks being separated from one another by transverse cuts that form, for each tread pattern block, a leading face, a contact face and a trailing face for a preferred rolling direction of the tread,
        said leading face having a radial height HRA greater than a radial height HRF of the trailing face,
        the contact face being oriented at an angle α with respect to a radial direction Z, α being between 93 and 105 degrees and
        a radial depth PR of the transverse cuts being at least equal to 50% of the radial height HRA of the leading face,
        a width of each block representing at least 15% of the width of the tread,
        said tread pattern elements also comprising lateral tread pattern elements that include a contact face, a leading face and a trailing face, said leading face being inclined at an angle γ towards the rear with respect to the radial direction Z in the preferred rolling direction of the tread, the angle γ being between 50 degrees and 75 degrees,
    wherein a number of the lateral tread pattern elements being equal to half a number of the tread pattern elements,
    wherein the lateral tread pattern elements are separated by bearing surface portions each having a circumferential width that axially terminates at a respective tread pattern element,
    wherein each of the lateral tread pattern elements, the tread pattern blocks, and the bearing surface portions have a same circumferential width.

2. The tread according to claim 1, wherein the transverse cuts are transverse sipes.

3. The tread according to claim 2, wherein the radial depth PR of the transverse sipes is at least equal to 70% of the radial height of the leading face HRA.

4. The tread according to claim 2, wherein the transverse sipes are inclined towards the front in the rolling direction of the tread, the transverse sipes being oriented at an angle β with respect to the radial direction Z, β being between 5 and 35 degrees.

5. The tread according to claim 4, wherein β is at least equal to 20 degrees.

6. The tread according to claim 1, wherein the angle α is between 97 and 100 degrees.

7. The tread according to claim 1, wherein the angle γ is between 60 degrees and 70 degrees.

8. The tread according to claim 1, wherein the lateral tread pattern elements are blocks that have a quadrilateral base and form rows in a transverse direction between one another.

9. The tread according to claim 8, wherein the tread pattern blocks within each row are disposed such that their leading faces are aligned with one another.

10. The tread according to claim 1, the lateral tread pattern elements being formed outside the central part of the tread.

11. The tread according to claim 10, the leading face of each lateral tread pattern element aligning with the leading face of an adjacent tread pattern element.

12. The tread according to claim 11, each lateral tread pattern element being adjacent to only one tread pattern element.

13. The tread according to claim 12, each lateral tread pattern element being a portion of a lug.

14. The tread according to claim 1, the tread being symmetrical with respect to an equatorial mid-plane.

15. A tire comprising a tread according to claim 1.

16. A caterpillar track comprising a tread according to claim 1.

17. A non-pneumatic wheel comprising a tread according to claim 1.

\* \* \* \* \*